United States Patent
Sun et al.

(10) Patent No.: US 9,222,842 B2
(45) Date of Patent: Dec. 29, 2015

(54) HIGH TEMPERATURE SENSOR WAFER FOR IN-SITU MEASUREMENTS IN ACTIVE PLASMA

(71) Applicants: Mei Sun, Los Altos, CA (US); Earl Jensen, Santa Clara, CA (US); Farhat Quli, Union City, CA (US); Stephen Sharratt, Mountain View, CA (US)

(72) Inventors: Mei Sun, Los Altos, CA (US); Earl Jensen, Santa Clara, CA (US); Farhat Quli, Union City, CA (US); Stephen Sharratt, Mountain View, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 349 days.

(21) Appl. No.: 13/787,178

(22) Filed: Mar. 6, 2013

(65) Prior Publication Data
US 2014/0192840 A1    Jul. 10, 2014

Related U.S. Application Data

(60) Provisional application No. 61/749,872, filed on Jan. 7, 2013.

(51) Int. Cl.
*H01L 21/00* (2006.01)
*G01K 1/14* (2006.01)
*G01K 1/12* (2006.01)

(52) U.S. Cl.
CPC .. *G01K 1/14* (2013.01); *G01K 1/12* (2013.01); *G01K 2215/00* (2013.01)

(58) Field of Classification Search
None
See application file for complete search history.

(56) References Cited

U.S. PATENT DOCUMENTS

| | | | |
|---|---|---|---|
| 6,359,333 B1 | 3/2002 | Wood et al. | |
| 6,776,873 B1 | 8/2004 | Sun et al. | |
| 7,135,852 B2 | 11/2006 | Renken et al. | |
| 7,972,884 B2* | 7/2011 | Obata et al. | 438/48 |
| 2002/0117623 A1 | 8/2002 | Cole | |
| 2004/0072384 A1 | 4/2004 | Cole | |
| 2004/0225462 A1 | 11/2004 | Renken et al. | |
| 2005/0101161 A1 | 5/2005 | Weiblen et al. | |
| 2005/0213079 A1 | 9/2005 | Fink | |
| 2006/0065941 A1 | 3/2006 | Delapierre | |
| 2006/0174720 A1* | 8/2006 | Renken et al. | 73/866.1 |

(Continued)

FOREIGN PATENT DOCUMENTS

JP    2010127657 A    6/2010
KR    100715112 B1    5/2007

OTHER PUBLICATIONS

Co-Pending U.S. Appl. No. 12/892,841, to Andrew Nguyen, filed Sep. 28, 2010.

(Continued)

*Primary Examiner* — Kyoung Lee
(74) *Attorney, Agent, or Firm* — Joshua D. Isenberg; JDI Patent (57) ABSTRACT

Aspects of the present disclosure disclose a component module in a process condition measuring device comprises a support for supporting a component, one or more legs configured to suspend the support in a spaced-apart relationship with respect to a substrate. An electrically conductive or low-resistivity semiconductor enclosure is configured to enclose the component, the support and the legs between the substrate and the enclosure. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

57 Claims, 3 Drawing Sheets

(56) References Cited

U.S. PATENT DOCUMENTS

| | | |
|---|---|---|
| 2007/0004080 A1 | 1/2007 | Ouyang |
| 2007/0251339 A1 | 11/2007 | Wiese et al. |
| 2008/0207432 A1 | 8/2008 | Hamada |
| 2009/0294880 A1 | 12/2009 | Feyh |
| 2010/0269590 A1 | 10/2010 | Guenther et al. |

OTHER PUBLICATIONS

Co-Pending U.S. Appl. No. 61/749,872, to Mei Sun, filed Jan. 7, 2013.

Final Office Action for U.S. Appl. No. 12/892,841, dated Oct. 7, 2013.

International Search Report and Written Opinion for International Application No. PCT/US2011/050272, dated Apr. 12, 2012.

International Search Report and Written Opinion for International Application No. PCT/US2014/010349, mailed Apr. 30, 2014.

Non-Final Office Action for U.S. Appl. No. 12/892,841, dated Jun. 20, 2014.

Non-Final Office Action for U.S. Appl. No. 12/892,841, dated Jun. 25, 2012.

Non-Final Office Action for U.S. Appl. No. 12/892,841, dated Mar. 5, 2013.

Non-Final Office Action for U.S. Appl. No. 12/892,841, dated Jan. 2, 2015.

* cited by examiner

HIGH TEMPERATURE SENSOR WAFER FOR IN-SITU MEASUREMENTS IN ACTIVE PLASMA

CLAIM PRIORITY

This application claims the priority benefit of commonly owned, co-pending U.S. Provisional Patent Application No. 61/749,872, to Mei Sun, filed Jan. 7, 2013, and entitled "HIGH TEMPERATURE SENSOR WAFER FOR IN-SITU MEASUREMENTS IN ACTIVE PLASMA" the entire disclosures of which are incorporated herein by reference.

FIELD OF THE INVENTION

Embodiments of the present invention relate to high temperature process condition measuring devices, and more particularly to an apparatus and a method that keeps the components of the measuring device at an appropriate operating temperature and isolated from the plasma while the device is exposed in a high temperature environment and/or an operational plasma processing environment over an extend period of time.

BACKGROUND OF THE INVENTION

Semiconductor fabrication generally involves numerous sophisticated and complex processing steps. Monitoring and evaluation of each process step is crucial to ensure the manufacturing accuracy and to ultimately achieve the desired performance of a finished device. Throughout numerous processes, such as the imaging process, deposition and growth process, etching and masking process, it is critical, for example, that temperature, gas flow, vacuum pressure, gas chemistry or plasma composition and exposure distance be carefully controlled during each step. Careful attention to the various processing conditions involved in each step is a requirement of optimal semiconductor or thin film processes. Any deviation from optimal processing conditions may cause the ensuing integrated circuit or device to perform at a substandard level or, worse yet, fail completely.

Within a processing chamber, processing conditions can vary. The variations in processing conditions such as temperature, gas flow rate and/or gas composition greatly affect the formation and thus the performance of the integrated circuit. Using a substrate-like device to measure the processing conditions that is of the same or similar material as the integrated circuit or other device provides the most accurate measure of the conditions because the thermal conductivity of the substrate is the same as the actual circuits that will be processed. Gradients and variations exist throughout the chamber for virtually all processing conditions. These gradients therefore also exist across the surface of a substrate. In order to precisely control processing conditions at the substrate, it is critical that measurements be taken upon the substrate and that the readings are available to an automated control system or operator so that the optimization of the chamber processing conditions can be readily achieved. Processing conditions include parameters used to control semiconductor or other device manufacture or conditions a manufacturer would desire to monitor.

Low profile wireless measuring devices are typically mounted on the substrate to measure the processing conditions. For a low profile wireless measuring device to work in a high temperature environment (e.g., temperatures greater than about 150° C.), certain key components of the device, such as thin batteries and microprocessors, must be able to function when the device is exposed to the high temperature environment. In general, the back AR coating (BARC) process operates at 250° C.; a PVD process may operate at about 300° C. and a CVD process may operate at a temperature of about 500° C. Unfortunately, batteries and microprocessors suitable for being used with the measuring devices cannot withstand temperature above 150° C. In addition, the measuring devices may be used for measurement in an operational plasma processing environment. These devices may be exposed to harsh conditions such as excessive temperatures, corrosive chemicals, and bombardment by high energy ions, and high levels of electromagnetic and other radiative noise. Thus, it is desirable to have shielding that may block electrostatic fields and electromagnetic fields from interference with the signals from the measuring devices.

An additional challenge faced by such measuring devices is minimization of the device profile. Such devices should keep a profile of 5 mm or less above the top surface of the substrate in order to fit into various process chambers.

It is within this context that embodiments of the present invention arise.

SUMMARY OF THE INVENTION

According to aspects of the present disclosure, a component module in a process condition measuring device comprises a support configured to support a component; one or more legs configured to suspend the support in a spaced-apart relationship with respect to a substrate; and an electrically conductive or low-resistivity semiconductor enclosure configured to enclose the component, the support and the legs between the substrate and the enclosure.

According to additional aspects of the present disclosure, a process condition measuring device comprises a substrate; and one or more component modules mounted on the substrate. The one or more component modules include a support for supporting a component, one or more legs configured to suspend the support in a spaced-apart relationship with respect to a substrate, and an electrically conductive or low-resistivity semiconductor enclosure configured to enclose the component, the support and the legs between the substrate and the enclosure.

An additional aspect of the present disclosure describes a process condition measuring device comprising a substrate with a shielding layer covering the substrate and one or more component modules mounted on the substrate. The one or more component modules are covered by an electrically conductive module shielding configured to provide electrical and thermal protection of the one or more component modules.

BRIEF DESCRIPTION OF THE DRAWINGS

Objects and advantages of the invention will become apparent upon reading the following detailed description and upon reference to the accompanying drawings in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention. Additionally, because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention.

In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated. The following detailed description, therefore, is not to be taken in a limiting sense, and the scope of the present invention is defined by the appended claims.

Additionally, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a thickness range of about 1 nm to about 200 nm should be interpreted to include not only the explicitly recited limits of about 1 nm and about 200 nm, but also to include individual sizes such as but not limited to 2 nm, 3 nm, 4 nm, and sub-ranges such as 10 nm to 50 nm, 20 nm to 100 nm, etc. that are within the recited limits.

The remainder of the specification makes reference to components of process condition measuring devices when describing embodiments of the present disclosure. By way of example, and not by way of limitation, the electronic components may comprise a power or energy source such as a battery, memory, transceiver, CPU, or any other electronic components configured to facilitate measurement and analysis of process conditions.

As defined herein, "processing conditions" refer to various processing parameters used in manufacturing an integrated circuit. Processing conditions include any parameter used to control semiconductor manufacture or any condition a manufacturer would desire to monitor such as, but not limited to, temperature, etch rate, thickness of a layer on a substrate, processing chamber pressure, gas flow rate within the chamber, gaseous chemical composition within the chamber, position within a chamber, electrical plasma properties, light energy density, and vibration and acceleration of a wafer or other substrate within a chamber or during movement to or from a chamber. Different processes will inevitably be developed over the years, and the processing conditions will, therefore, vary over time. Whatever the conditions may be, it is foreseen that the embodiments described below can measure such condition. In addition to measuring these conditions during the processing of semiconductor wafers, the systems and techniques described herein may also be applied to monitoring similar conditions during processing of other type of substrates, such as wafer masks.

Figure 1A:
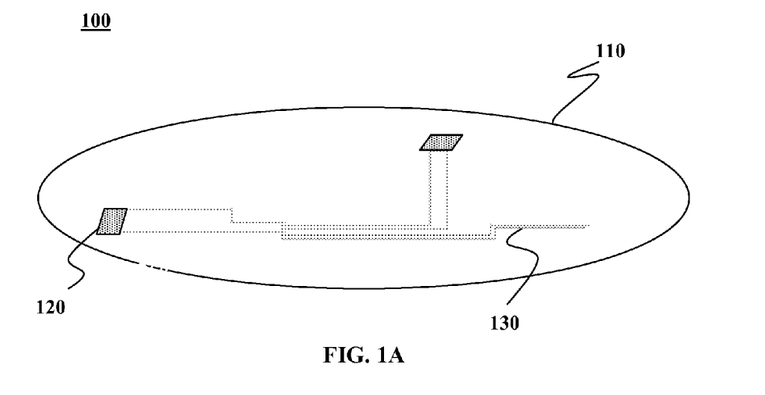
FIG. 1A is a schematic diagram of a process condition measuring device according to an embodiment of the present disclosure.

FIG. 1A is a schematic diagram of a process condition measuring device. The measuring device 100 includes a substrate 110 with at least one sensor element 120 and necessary interconnect wiring 130.

The substrate 110 may be the same size and shape as a standard substrate processed by a substrate processing system. The substrate 110 may be made of the same material as a standard substrate processed by the system. For example, if the measuring device is used to monitor process conditions in a semiconductor wafer processing system that processes silicon wafers, the substrate 110 may be made of silicon. Examples of standard sized silicon substrate include, but are not limited to 150 mm, 200 mm, 300 mm and 450 mm.

Sensor element 120 and interconnect wiring 130 may be formed directly on the substrate surface. By way of example, and not by way of limitation, sensor element 120 may be an electromagnetic sensor, a thermal sensor, an optical or an electrical sensor. In one example, sensors are made of a meandering conductive material. Details of various types of sensors can be found in commonly assigned, co-pending U.S. patent application Ser. No. 12/892,841 filed Sep. 28, 2010 and fully incorporated herein by reference for all purpose.

The device 100 may include a component module 150 that includes an electronic component. By way of example, and not by way of limitation, the component module 150 may include a power source, a memory, or a processor configured to execute instructions stored in the main memory in order for the measuring device 100 to properly measure and record process parameters when the device is placed within a substrate processing tool. Certain elements of the measurement electronics may be included within a component module. By way of example, and not by way of limitation, a power source and a CPU each may be enclosed in a component module. As described in detailed below, one or more component modules are mounted on the substrate 110.

Figure 1B:
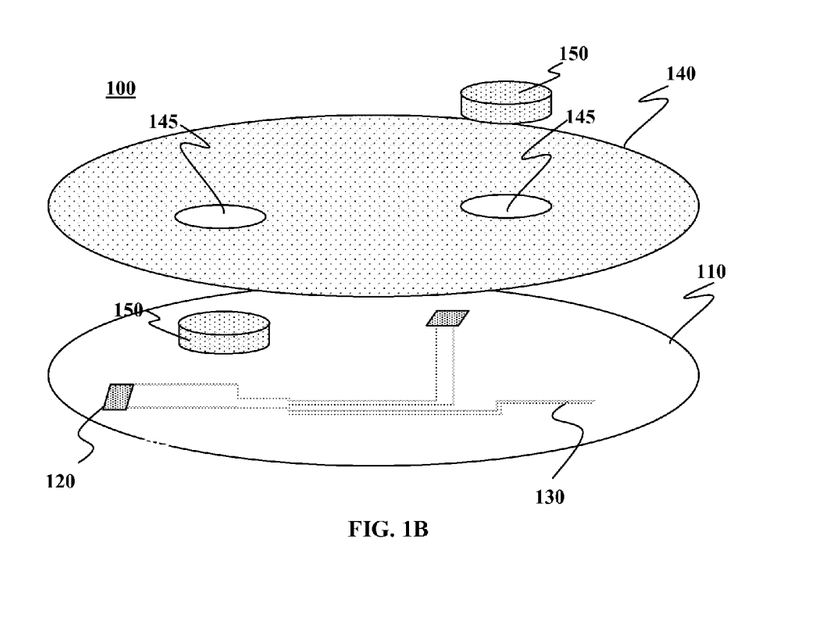
FIG. 1B is a schematic diagram of a process condition measuring device according to an embodiment of the present disclosure.

Optionally, a cover 140 may be formed over the substrate 110 to cover the measurement sensor element 120 and interconnect wiring 130. In one example, the cover 140 is made of high conductivity type silicon. Examples are highly Phosphorus doped Silicon, P+ and heavily Boron doped Silicon, N+ silicon. As shown in FIG. 1B, the cover 140 may have one or more through holes 145 to accommodate the component modules 150 which may be mounted to the substrate 110 as described below. Alternatively, the component module 150 may be mounted to the cover 140, which in turn covers substrate 110.

Figure 2A:
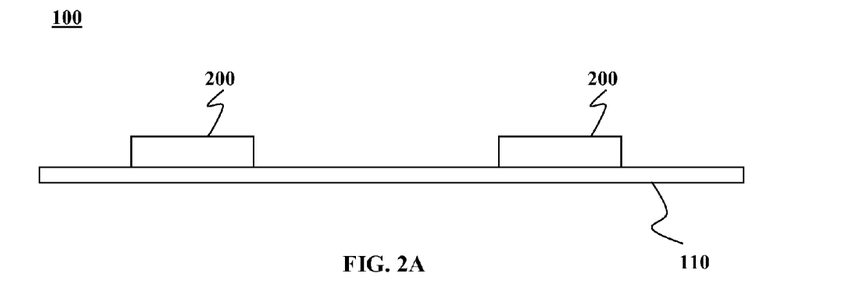
FIG. 2A is a cross-sectional view of a process condition measuring device with a component module according to an embodiment of the present disclosure.
Figure 2B:
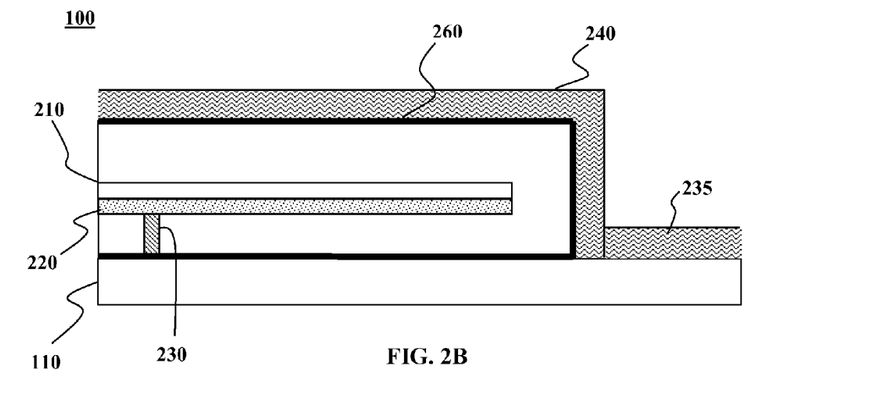
FIG. 2B is an enlarged cross-sectional view of a component module mounted on a process condition measuring device in accordance with an embodiment of the present disclosure.

FIG. 2A is a cross-sectional view of a process condition measuring device with component modules according to an embodiment of the present invention. As shown in FIG. 2A, two component modules 200 are mounted on the substrate 110. FIG. 2B is an enlarged cross-sectional view of one component module 200. The component module 200 includes temperature sensitive components with limited operational temperature range 210, a support 220 for the component and a set of one or more legs 230 to be mounted to a substrate 110. As shown in FIG. 2B, a support 220 may be mounted to the top surface of the substrate 110 by the one or more leg 230.

Alternatively, a support 220 may be mounted on the legs 230 into substrate cavities formed in the top surface of the substrate (not shown).

By way of example, the components with limited operational temperature range 210 may be power source (e.g., battery, supercapacitor photovoltaic device), memory, transceiver, CPU, etc. There may be a single power source or alternatively more than one power source, depending on the application and resulting power needs. The component 210 may be very thin. By way of example, the component may have a total thickness of about 0.15 mm or less.

A component 210 is placed upon and supported by a support 220. The support 220 may be made of a thin, flat and a high volumetric heat capacity material. In one example, the support is made of sapphire or alumina ($Al_2O_3$). In one example, the support may have a cavity or recess so that the component may be sized and shaped to fit within the cavity or recess in the support 220. The thickness of the support 220 may be about 0.5 mm.

One or more legs or posts 230 are mounted to a bottom surface of the support 220. The legs 230 allow the component module 200 to be positioned away from the substrate 110 to form a gap between a top surface of the substrate or a surface of the enclosure 110 and a surface of the support 220. Such a gap may be a vacuum, or at a very low pressure which provides an additional layer of thermal insulation. Thus, the thermal energy of substrate 110 is only poorly transferred to the support 220 and the component 210 because of the insulating layer formed by the gap/vacuum and the low thermal conductivity of the legs 230. The gap need not be very large in order to obtain effective thermal insulation. By way of example, and not by way of limitation, effective thermal insulation may be obtained if the distance d between the top surface of the substrate and the bottom surface of the support is about 0.25 mm. Additionally, the legs 230 may be configured to provide a very limited conductive thermal energy transfer path from the substrate 110 to the support 220. In one example, legs 230 may be 1 mm in diameter or width (if not round) and 1 mm in height. Additionally, the cross-sectional dimensions of the legs 230 may be such that the legs are relatively long and thin in order to reduce the thermal energy transfer through the legs. Moreover, the thermal energy transfer efficiency between the substrate 110 and the support 220 may be limited by making the legs 230 from a high-strength low thermal conductivity material. By way of example, and not by way of limitation, these legs 230 may be composed of stainless steel, quartz, glass, foams or aerogels, or any other materials that are strong enough to hold the support 230 above the substrate and exhibit low thermal energy transfer characteristics.

An enclosure 240 is provided to cover the component 210, the support 220 and the legs 230 for protection of the component inside the enclosure from ion bombardment and subsequent heating. The component module 200 may have a total thickness less than 3 millimeter The enclosure 240 is preferably made of a semiconductor material that is the same material as standard production wafers. By way of example, the enclosure 240 and the substrate 110 may be made of a low resistivity semiconductor material, such as P+ silicon. Such a configuration is advantageous in that all exposed surfaces of the measuring device 100 are silicon. In some implementations, a cover 235 may be mounted over the substrate 110, e.g., as illustrated in FIG. 1B. The cover 235 may include through-holes configured to receive the enclosure 240. In such a case, the cover 235 and the enclosure 240 may be made of the same material, e.g., a conductive material or low-resistivity semiconductor, such as P+ silicon.

The thickness of the wall of the enclosure may be about 0.5 mm. The enclosure 240 is evacuated and bonded to the substrate 110 or the cover 140 to form a vacuum seal and thereby further insulating the component 210. Alternatively, the enclosure 240 need not be vacuum tight if the processing environment is maintained at a low enough vacuum level to increase the thermal delay. By way of example, a vacuum level in the enclosure 240 may be less than 20 mTorr.

The inside of the enclosure 240 may be polished to provide a low emissivity surface for further heat shielding. The surfaces of support 220 and the components 210 may also be treated to absorb less thermal energy. This can be achieved by polishing and or coating the surface with a low emissivity film. Alternatively the inside of the enclosure 240 may be coated with a low emissivity thin film material 260. As used herein, a material having a surface with an emissivity between 0.0 and 0.2 can be considered "low emissivity". Radiation from the process chamber, ion bombardment, and conduction from the substrate 110 contributes to the temperature increase on the top portion and sidewalls of the enclosure 240. By polishing and coating, a significant reduction of the heat radiating from the inside portion of the top and sidewalls of the enclosure will be ensured. This will reduce heat transfer by radiation to the components 210 and support 220 from the enclosure 240, which would result in slower heating of the component 210. By the way of example, a highly reflective material, e.g., gold, platinum, aluminum or any highly reflective film, may be coated on the inside of the enclosure to reduce emissivity and heat radiation from substrate 110 and enclosure 240.

After one or more enclosure 240 is aligned on the substrate 110, it is physically and electrically connected by bonding processes. The dimensions of the component module 200 may be constrained by the dimensions of the processing chamber in which the measuring device 100 is used. Consequently, the height of the component module 200 may be configured to meet the specification of the processing chamber. The height of the module refers to the distance between the top surface of the substrate and the top surface of the enclosure 240. By way of example, and not by way of limitation, the height of the module 200 may less than 3 mm, and preferably, less than 2 mm.

Figure 2C:
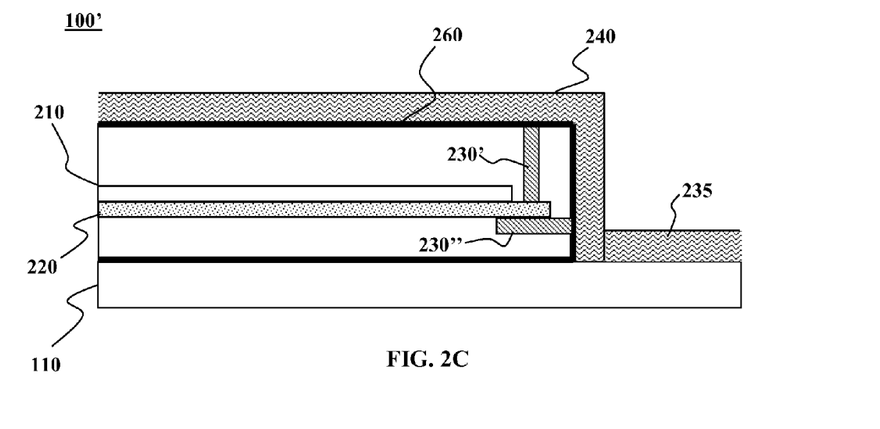
FIG. 2C is an enlarged cross-sectional view of a component module mounted on a process condition measuring device in accordance with an alternative embodiment of the present disclosure.

It is noted that many variations are possible on the implementation illustrated in FIG. 2B. For example, in some alternative implementations, the support 220 may be suspended from the inside of the enclosure 240, e.g., as shown in the device 100' depicted in FIG. 2C. In particular, the support 220 may be suspended from a top portion of the enclosure 240 e.g., by legs 230' that extend downwards from a top of the enclosure. Alternatively, the support 220 may be suspended by legs 230" that are attached one or more sides of the enclosure 240 that extend inward. In some implementations, the support 220 may be supported by a combination involving two or more of upward extending legs 230 attached to the substrate 110, legs 230' that extend from the top portion of the enclosure 240, or legs 230" attached to one or more sides of the enclosure that extend inward. As such, embodiments of the present disclosure are not limited to the implementations illustrated.

In some embodiments of the present disclosure described above, all exposed portions of the measuring device 100 may be made of high conductivity type silicon (e.g., P+ silicon) which is the same material as a standard silicon wafer. As a result, any contamination concerns can be eliminated. Additionally, the component module with a high conductivity type silicon enclosure electrically connects to a high conductivity type silicon substrate, thereby forming a Faraday shield around the component to prevent RF interference. Also, the component module is evacuated and vacuum sealed to the substrate or the cover so that the component inside the module has a significant delay of temperature rise relative to the wafer temperature. This would allow sufficient time for the measuring electronics to collect data in the chamber.

Figure 3:
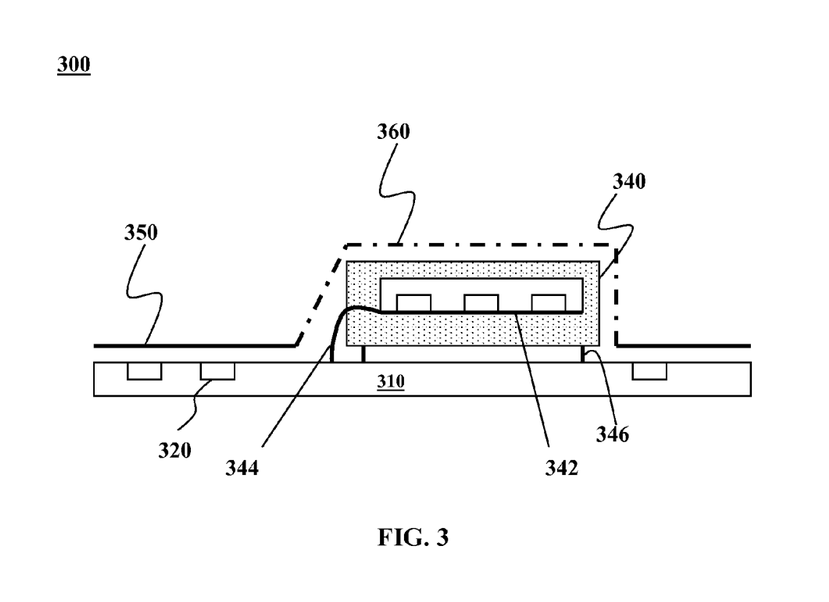
FIG. 3 is a cross-sectional view of a process condition measuring device with a component module according to an embodiment of the present disclosure.

According to an aspect of the present disclosure, a measuring device 300 includes a substrate 310 with sensors 320 and interconnect wiring (not shown) formed on the surface of the substrate, and at least one component module 340 mounted on the substrate. The component module 340 may be any conventional module for enclosing temperature sensitive components 342, such as CPU or batteries. In one example, the component module 340 may be made of a high volumetric heat capacity material such as stainless steel. Stainless steel has high volumetric heat capacity, and as such requires a large input of thermal energy to rise in temperature. Alternatively, the module 340 may be composed of sapphire, Kovar®, Invar®, or any other material that exhibits a heat capacity similar to that of stainless steel. Kovar is a trademark of Carpenter Technology Corporation of Reading, Pa. Kovar refers to a nickel-cobalt ferrous alloy designed to be compatible with the thermal expansion characteristics of borosilicate glass. The composition of Kovar is about 29% nickel, 7% cobalt, less than 0.1% carbon, 0.2% silicon, 0.3% manganese with the balance being iron. Invar is a trademark of Imphy Alloys Joint Stock Company France of Hauts-De-Seine, France. Invar, also known generically as FeNi36 (64FeNi in the U.S.), is a nickel steel alloy notable for its uniquely low coefficient of thermal expansion. The component module 340 may be separated from substrate 310 on one or more legs 346. The component 342 may be electrically connected to the traces on the substrate 110 by wire bonding 344.

A shield layer 350 may cover sensors 320 and the interconnect wiring on the substrate 310. In one example, the shield layer 350 could be made of stainless steel, aluminum or copper. As for the component module 340, a module shielding 360 is provided to electrically and thermally protect the component modules. As an example, the module shielding 360 may be made of stainless steel or aluminum foil. The module shielding 360 may be solid or mesh. The device 300 may have a thickness less than about 3 millimeters (e.g., about 2 to 3 millimeters) measured from a top of the shield layer 350 to a top surface of the substrate 310.

Aspects of the present disclosure provide component modules for process condition measuring devices having robust electrical, thermal and electromagnetic shielding. Such shielding of component modules facilitates use of a process condition measuring device in a plasma environment.

The appended claims are not to be interpreted as including means-plus-function limitations, unless such a limitation is explicitly recited in a given claim using the phrase "means for." Any element in a claim that does not explicitly state "means for" performing a specified function, is not to be interpreted as a "means" or "step" clause as specified in 35 USC §112, ¶6. In particular, the use of "step of" in the claims herein is not intended to invoke the provisions of 35 USC §112, ¶6.

What is claimed is:

1. A component module in a process condition measuring device, comprising;
    a support configured to support a component;
    one or more legs configured to suspend the support in a spaced-apart relationship with respect to a substrate; and
    an electrically conductive or low-resistivity semiconductor enclosure configured to enclose the component, the support and the one or more legs, wherein the one or more legs are attached to a top portion of the enclosure at one end and configured to suspend the support at another end, or attached to a side of the enclosure at one end and configured to suspend the support at another end.

2. A component module of claim 1, wherein the component module has a total thickness less than 3 millimeter.

3. A component module of claim 1, wherein the component includes one or more power sources.

4. A component module of claim 1, wherein the component includes a central processing unit.

5. A component module in a process condition measuring device, comprising:
    a support configured to support a component;
    one or more legs configured to suspend the support in a spaced-apart relationship with respect to a substrate; and
    an electrically conductive or low-resistivity semiconductor enclosure configured to enclose the component, the support and the one or more legs, wherein the support is made of sapphire or alumina.

6. The component of claim 5, wherein the one or more legs are attached to a bottom surface of the support at one end and configured to attach to a top surface of a substrate at another end.

7. The component module of claim 5, wherein the component module has a total thickness less than 3 millimeter.

8. The component module of claim 5, wherein the component includes one or more power sources.

9. The component module of claim 5, wherein the component includes a central processing unit.

10. A component module in a process condition measuring device, comprising:
    a support configured to support a component;
    one or more legs configured to suspend the support in a spaced-apart relationship with respect to a substrate; and
    an electrically conductive or low-resistivity semiconductor enclosure configured to enclose the component, the support and the one or more legs, wherein the legs are made of stainless steel, quartz or glass or made of aerogel or foam.

11. The component of claim 10, wherein the one or more legs are attached to a bottom surface of the support at one end and configured to attach to a top surface of a substrate at another end.

12. The component module of claim 10, wherein the component module has a total thickness less than 3 millimeter.

13. The component module of claim 10, wherein the component includes one or more power sources.

14. The component module of claim 10, wherein the component includes a central processing unit.

15. A component module in a process condition measuring device, comprising:
    a support configured to support a component;
    one or more legs configured to suspend the support in a spaced-apart relationship with respect to a substrate; and
    an electrically conductive or low-resistivity semiconductor enclosure configured to enclose the component, the support and the one or more legs, wherein the enclosure is made of high conductivity type silicon.

16. The component of claim 15, wherein the one or more legs are attached to a bottom surface of the support at one end and configured to attach to a top surface of a substrate at another end.

17. The component module of claim 15, wherein the component module has a total thickness less than 3 millimeter.

18. The component module of claim 15, wherein the component includes one or more power sources.

19. The component module of claim 15, wherein the component includes a central processing unit.

20. A component module in a process condition measuring device, comprising:
a support configured to support a component;
one or more legs configured to suspend the support in a spaced-apart relationship with respect to a substrate; and
an electrically conductive or low-resistivity semiconductor enclosure configured to enclose the component, the support and the one or more legs, wherein inner surfaces of the enclosure are polished to form low emissivity surfaces or coated with a low emissivity material or wherein an inside surface of the enclosure is polished or coated with gold, platinum, or any highly reflective film.

21. The component of claim 20, wherein the one or more legs are attached to a bottom surface of the support at one end and configured to attach to a top surface of a substrate at another end.

22. The component module of claim 20, wherein the component module has a total thickness less than 3 millimeter.

23. The component module of claim 20, wherein the component includes one or more power sources.

24. The component module of claim 20, wherein the component includes a central processing unit.

25. A process condition measuring device, comprising:
a substrate;
one or more component modules mounted on the substrate, wherein the one or more component modules include a support for supporting a component, one or more legs configured to suspend the support in a spaced-apart relationship with respect to a substrate, and an electrically conductive or low-resistivity semiconductor enclosure configured to enclose the component, the support and the one or more legs; and
a cover covering the substrate, wherein the cover has one or more through holes configured to accommodate the one or more component modules.

26. The device of claim 25, wherein the cover and the enclosure are made of the same material.

27. The device of claim 25, wherein the cover and the enclosure are made of high conductivity type silicon.

28. The device of claim 25, wherein the enclosure is sealed to the cover and has a pressure less than 20 mTorr.

29. The device of claim 25, wherein the component module has a total thickness less than 3 millimeter.

30. The device of claim 25, wherein the component includes a central processing unit.

31. The device of claim 25, wherein the one or more legs are attached to a bottom surface of the support at one end and configured to attach to a top surface of a substrate at another end.

32. A process condition measuring device, comprising:
a substrate; and
one or more component modules mounted on the substrate, wherein the one or more component modules include a support for supporting a component, one or more legs configured to suspend the support in a spaced-apart relationship with respect to a substrate, and an electrically conductive or low-resistivity semiconductor enclosure configured to enclose the component, the support and the one or more legs, wherein the substrate and the enclosure are made of the same material.

33. The device of claim 32, wherein the substrate and the enclosure are made of high conductivity type silicon.

34. The device of claim 32, wherein the component module has a total thickness less than 3 millimeter.

35. The device of claim 32, wherein the component includes a central processing unit.

36. The device of claim 32, wherein the one or more legs are attached to a bottom surface of the support at one end and configured to attach to a top surface of a substrate at another end.

37. A process condition measuring device, comprising:
a substrate; and
one or more component modules mounted on the substrate, wherein the one or more component modules include a support for supporting a component, one or more legs configured to suspend the support in a spaced-apart relationship with respect to a substrate, and an electrically conductive or low-resistivity semiconductor enclosure configured to enclose the component, the support and the one or more legs, wherein inner surfaces of the enclosure are polished to form a low emissivity surface or coated with a low emissivity material.

38. The device of claim 37, wherein the component module has a total thickness less than 3 millimeter.

39. The device of claim 37, wherein the component includes a central processing unit.

40. The device of claim 37, wherein the one or more legs are attached to a bottom surface of the support at one end and configured to attach to a top surface of a substrate at another end.

41. A process condition measuring device, comprising:
a substrate; and
one or more component modules mounted on the substrate, wherein the one or more component modules include a support for supporting a component, one or more legs configured to suspend the support in a spaced-apart relationship with respect to a substrate, and an electrically conductive or low-resistivity semiconductor enclosure configured to enclose the component, the support and the one or more legs, wherein the enclosure is sealed to the substrate and has a pressure less than 20 mTorr.

42. The device of claim 41, wherein the component module has a total thickness less than 3 millimeter.

43. The device of claim 41, wherein the component includes a central processing unit.

44. The device of claim 41, wherein the one or more legs are attached to a bottom surface of the support at one end and configured to attach to a top surface of a substrate at another end.

45. A process condition measuring device, comprising:
a substrate; and
one or more component modules mounted on the substrate, wherein the one or more component modules include a support for supporting a component, one or more legs configured to suspend the support in a spaced-apart relationship with respect to a substrate, and an electrically conductive or low-resistivity semiconductor enclosure configured to enclose the component, the support and the one or more legs, wherein the component includes one or more batteries.

46. The device of claim 45, wherein the component module has a total thickness less than 3 millimeter.

47. The device of claim 45, wherein the component includes a central processing unit.

48. The device of claim 45, wherein the one or more legs are attached to a bottom surface of the support at one end and configured to attach to a top surface of a substrate at another end.

49. A process condition measuring device, comprising:
a substrate; and
one or more component modules mounted on the substrate, wherein the one or more component modules include a support for supporting a component, one or more legs configured to suspend the support in a spaced-apart relationship with respect to a substrate, and an electrically conductive or low-resistivity semiconductor enclosure configured to enclose the component, the support and the one or more legs, wherein the one or more legs are attached to a top portion of the enclosure at one end and configured to suspend the support at another end or attached to a side of the enclosure at one end and configured to suspend the support at another end.

50. The device of claim 49, wherein the component module has a total thickness less than 3 millimeter.

51. The device of claim 49, wherein the component includes a central processing unit.

52. A process condition measuring device, comprising:
a substrate with a shielding layer covering the substrate; and
one or more component modules mounted on the substrate, wherein the one or more component modules is covered by an electrically conductive module shielding configured to provide electrical and thermal protection of the one or more component modules, wherein the one or more component modules includes one or more batteries.

53. The device of claim 52, wherein the component modules are mounted on the substrate by one or more legs.

54. The device of claim 52, wherein the shielding layer is made of high conductivity type silicon, copper, aluminum or stainless steel.

55. The device of claim 52, wherein the module shielding is made of aluminum or stainless steel.

56. The device of claim 52, wherein the module shielding is solid or mesh.

57. The device of claim 52, wherein the device has a thickness less than 3 millimeters from a top of the module shielding to a top surface of the substrate.

* * * * *